United States Patent [19]

Irwin

[11] Patent Number: 4,487,916

[45] Date of Patent: Dec. 11, 1984

[54] MELT-SPINNABLE COPOLYESTERS

[75] Inventor: Robert S. Irwin, Wilmington, Del.

[73] Assignee: E.I. Du Pont de Nemours and Company, Wilmington, Del.

[21] Appl. No.: 562,115

[22] Filed: Dec. 16, 1983

[51] Int. Cl.$^3$ .................. C08G 63/18; C08G 63/66
[52] U.S. Cl. .................................. 528/193; 528/190; 528/194; 528/271
[58] Field of Search ............ 528/190, 191, 193, 194, 528/271, 125, 128

[56] References Cited

U.S. PATENT DOCUMENTS

| 3,991,014 | 11/1976 | Kleinschuster | 528/193 |
| 4,066,620 | 1/1978 | Kleinschuster et al. | 528/193 |
| 4,118,372 | 10/1978 | Schaefgen | 528/193 |
| 4,269,965 | 5/1981 | Irwin | 528/193 |

FOREIGN PATENT DOCUMENTS 55-133423  10/1980  Japan ................................ 528/193

Primary Examiner—Lester L. Lee

[57] ABSTRACT

Copolyesters useful for fibers from hydroquinone, 3,4'-dicarboxydiphenyl ether and from 10 to 20 mole % of a member of the group consisting of terephthalic acid, 2,6-naphthalenedicarboxylic acid, 4,4'-bibenzoic acid, 2,6-naphthalenediol and 4,4'-dihydroxydiphenyl.

6 Claims, No Drawings

MELT-SPINNABLE COPOLYESTERS

BACKGROUND OF THE INVENTION

1. Field of the Invention

This invention provides novel fiber-forming, melt-spinnable wholly aromatic copolyesters prepared from hydroquinone, 3,4'-dicarboxydiphenyl ether and a member of the group consisting of terephthalic acid, 2,6-naphthalenedicarboxylic acid, 4,4'-bibenzoic, 2,6-dihydroxynaphthalene, and 4,4'-dihydroxydiphenyl. These copolyesters are useful for preparation of filaments having high tenacity and/or high modulus. They are also useful for extrusion molded or injection molded products and for preparation of tough films.

2. Description of the Prior Art

Aromatic copolyesters are well known in the art and have yielded heat-treated fibers with properties that are especially useful in tire cords or drive belts. The provision of novel copolyesters for these purposes is deemed a worthwhile objective.

SUMMARY OF THE INVENTION

The present invention is directed to melt-spinnable copolyesters of fiber-forming molecular weight and consist essentially of Units I, II and III, said units having the structural formulas:

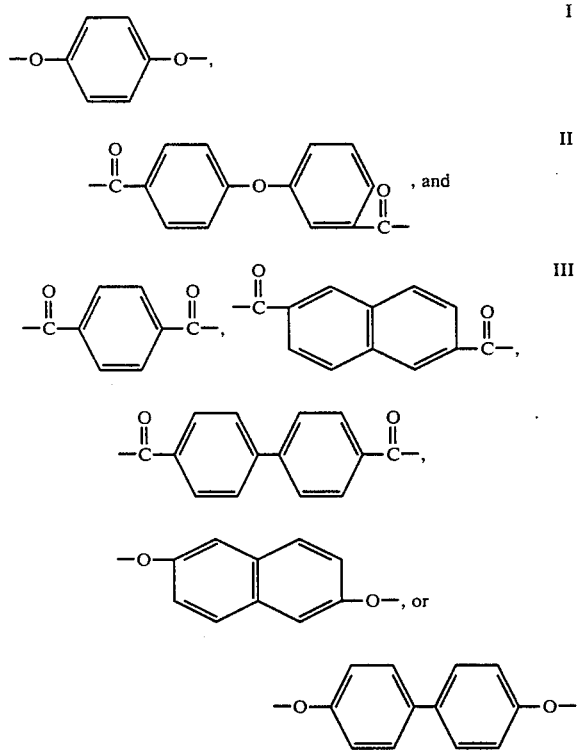

where Units I and II are each present in the amount of from about 30 to 50 mol % and Unit III is present in the amount of from about 10 to 20 mol %. In each case the number of dioxy units in the copolyester is substantially equal to the number of dicarbonyl units. Melt-spun and heat-strengthened filaments of such polyesters as well as films and molded or extruded articles from such polyesters are included in the invention.

DETAILED DESCRIPTION OF THE INVENTION

Unit I in the copolyesters of the invention is 1,4-dioxyphenylene (HQ). Unit II is 3,4'-dicarbonyldiphenyl ether (DCDPE). Unit III is terephthaloyl (TA), 4,4'-dioxydiphenyl (DHDP), 2,6-naphthalenedicarbonyl, 4,4'-bibenzoyl or 2,6-dioxynaphthalene.

The number of dioxy units present in the copolyester is substantially equal to the number of dicarbonyl units. Mole % is calculated on the basis of total moles of units present, i.e. [I+II+III].

Generally the diols are employed in the form of the diacetate whereas the terephthalic, bibenzoic or 2,6-naphthalene dicarboxylic acids are used as such.

The precursor reactants are generally combined in proportions corresponding to the molar proportions of the units desired in the copolyester products except that it is preferred to use a molar excess, indicated in the examples as (%), of the more volatile diacetate of the hydroquinone, the 4,4'-dihydroxydiphenyl, or the 2,6-naphthalenediol.

Conventional polymerization techniques may be employed such as described in U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium to approximately 310°–380° C. Polymerization is continued for up to a total of 0.5 to one hour or longer if necessary until a polymer of fiber-forming molecular weight is obtained. Usually a vacuum is applied to obtain a final product with high molecular weight. Copolyesters of the invention exhibit optical anisotropy in the melt as described in U.S. Pat. No. 4,118,372.

Filament Preparation

The copolyesters of the invention are spun into filaments by conventional melt-spinning at temperatures below decomposition temperatures, usually less than 360° C. In the examples below, filaments were prepared by melt-spinning into a quenching atmosphere and collected at a windup speed specified in the examples. Melt pumping speed is adjusted to give the approximate linear density (tex) shown in the tables at the stated windup rate.

As used herein, the term "as-spun fiber" refers to a fiber which has not been drawn or heat treated after extrusion and normal windup.

Heat Treatment and Utility

Following collection, the undrawn (as-spun) monofilaments, are heat-treated in essentially relaxed condition in an oven as taught in Luise U.S. Pat. No. 4,183,895. Heating is in a nitrogen atmosphere. The temperature is typically increased in stages from room temperature to a final temperature, which is usually that needed for the optimum development of high tenacity and break elongation.

Molecular weight growth during heat treatment can increase the flow temperature of the filaments (see U.S. Pat. No. 4,118,372), making possible heat treatment temperatures in excess of the original polymer flow temperature. The maximum heat-treatment temperature should be close to or above the initial flow temperature. High molecular weights favorably affect the development of high tenacity and break elongation. Higher spin stretch factor also favors the development of high tenacity, break elongation and modulus.

The heat treated fibers of this invention are useful for a variety of applications such as in ropes or in nonwoven sheets, and in reinforcement of plastic composites.

Test Methods

Inherent viscosity ($n_{inh}$), a measure of molecular weight, was computed from $n_{inh}=(\ln n_{rel})/C$ where $n_{rel}$ is the relative viscosity and C is solution concentration in grams of polymer per deciliter of solvent. Relative viscosity is the ratio of polymer solution flow time to solvent flow time in a capillary viscometer at 30° C. The solvent employed was a special mixture coded TM4PP consisting of 7.5% trifluoroacetic acid, 12.5% perchloroethylene, 17.5% methylene chloride, 50% 4-chlorophenol, and 12.5% dichlorotetrafluoroacetone hydrate. The concentration was 0.5 g polymer per deciliter of solvent.

Monofilament tensile properties were measured in accordance with A.S.T.M. 2101 Part 33 (1980) using a recording stress-strain analyzer at 70° F. (21.1° C.) and 65% relative humidity. Gauge length was 1.0 in (2.54 cm), and rate of elongation 10%/min. Results are reported as T/E/Mi where T is break tenacity in dN/tex, E is elongation-at-break expressed as the percentage by which initial length increased, and Mi is initial tensile modulus in dN/tex. Linear density is reported in tex units. Average tensile properties for five filament samples are reported.

EXAMPLES

The same general procedure was used in all the examples. It should be understood that the best values reported below are believed to be representative of what can be obtained. The data presented do not constitute all the runs performed involving the indicated reactants. Unfamiliarity with the reaction requirements of the system, use of impure reactants or inappropriate heat treatment conditions may have caused the variation in results such as lower tenacity, elongation or modulus to be obtained.

The monomer ingredients are added in substantially the same molar ratios as desired in the final polymer except that an excess (usually 4 to 7%) of acetylated diol is generally used. The resultant polymer is identified, for example, as HQ/TA/DCDPE (50/15/35) meaning it contained 50 mole % of 1,4-dioxyphenylene units (from the diacetate of hydroquinone), 15 mole % of tetraphthaloyl units (from terephthalic acid), and 35 mole % of 3,4'-dicarbonyldiphenyl ether units. Excesses of acetates are not included in these percentages.

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then vacuum was applied and pressure was reduced gradually from atmospheric to generally less than 1 mm of mercury (133.3 Pa). Heating under vacuum was then continued until viscosity had increased to a level believed satisfactory for melt-spinning. The cooled and solidified polymer was comminuted, and a portion was molded into a cylindrical plug for melt spinning.

EXAMPLE 1

Copolyester Fiber From Hydroquinone (HQ) Diacetate, 3,4'-Dicarboxydiphenyl Ether (DCDPE), And Terephthalic Acid (TA)

A polymer with a composition HQ/DCDPE/TA (50/35/15) was prepared by mixing the following in the polymerization vessel:
10.19 g HQ diacetate (0.0525 mole including 5% excess),
9.03 g DCDPE (0.035 mole), and
2.49 g TA (0.015 mole).

The mixture was heated in the polymerization vessel from 200° C. to 350° C. in 65 minutes at atmospheric pressure under nitrogen purge, then at 350°–355° C. for two minutes under vacuum while reducing the pressure to 0.5 mm. The resulting polymer softened on the thermal gradient hot bar at 276° C. and fibers could be pulled from the bar at 345° C. Inherent viscosity in TM4PP was 0.80. In the thermooptical test of Schaefgen U.S. Pat. No. 4,118,372 the polymer was optically anisotropic above the 341° C. measured flow temperature.

The polymer was melt spun through a single-hole spinneret with 0.23 mm hole diameter at 340°–350° C. and a windup speed of 500–600 ypm. The monofilament was heat treated in a nitrogen-purged atmosphere in an essentially relaxed condition starting at a temperature approximately 100° C. below the maximum oven temperature. The temperature was increased at a rate of 20° C. per hour until the maximum temperature of the heat treatment was reached. It was then held at this temperature for 16 hours. The following tensile properties were obtained for the as-spun fiber and fiber heat-treated at the indicated maximum temperatures:

|  | Max. Temp. | Tex | T | E | Mi |
| --- | --- | --- | --- | --- | --- |
| As-spun | — | 0.52 | 5.9 | 1.9 | 403 |
| Heat-Treated | 280° C. | 0.34 | 15.0 | 2.8 | 483 |
|  | 288° C. | 0.69 | 15.2 | 3.0 | 442 |
| (Best Value) |  |  | (17.5 | 2.9 | 513) |

EXAMPLE 2

Copolyester Fiber From Hydroquinone Diacetate, 3,4'-Dicarboxydiphenyl Ether, And Terephthalic Acid A polymer with a composition HQ/DCDPE/T (50/40/10) was prepared by mixing the following in the polymerization vessel:
10.19 g HQ diacetate (0.0525 mole including 5% excess),
10.32 g DCDPE (0.040 mole), and
1.66 g TA (0.010 mole).

The temperature was raised from 200° C. to 345° C. in 69 minutes at atmospheric pressure under nitrogen, then was heated at 345° C. to 350° C. for four minutes under vacuum while reducing the pressure from 25 mm to 2 mm. The resulting polymer on the thermal gradient hot bar softened at 320° C. and at 340' C. fibers could be pulled from the bar. Inherent viscosity in TM4PP was 0.72.

The polymer was melt spun through a single-hole spinneret with 0.23 mm hole diameter at a spinning temperature of 350° C. and a windup speed of 600 ypm. The fiber was heat-treated in a nitrogen purge as in Example 1. Tensile properties were as follows:

|  | Max. Temp. | Tex | T | E | Mi |
|---|---|---|---|---|---|
| As-Spun | — | 1.1 | 3.1 | 1.4 | 271 |
| Heat-Treated | 290° C. | 0.69 | 13.8 | 2.8 | 442 |
| (Best Value) |  |  | (14.9 | 3.1 | 374) |

EXAMPLE 3

Copolyester Fiber From Hydroquinone Diacetate, 4,4'-Dihydroxydiphenyl (DHDP) Diacetate 3,4'-Dicarboxydiphenyl Ether A polymer with a composition HQ/DHDP/DCDPE (30/20/50) was prepared by mixing the following in the polymerization vessel:
4.89 g HQ diacetate (0.0252 mole including 5% excess).
4.54 g DHDP diacetate (0.0168 mole including 5% excess), and
10.32 g DCDPE (0.040 mole).

The temperature was raised from 200° C. to 345° C. in 45 minutes at atmospheric pressure under nitrogen, then was raised from 345° C. to 350° C. in 5 minutes under vacuum while reducing the pressure from 25 mm to 0.5 mm. The resulting polymer on the thermal gradient hot bar softened at 300° C. and at 315° C. fibers could be pulled from the bar. Inherent viscosity in TM4PP was 0.66.

The polymer was melt spun through a single-hole spinneret with 0.23 mm hole diameter at a spinning temperature of 312° C. and a windup speed of 600 ypm. The fiber was heat-treated in a nitrogen purge as in Example 1. Tensile properties were as follows:

|  | Max. Temp. | Tex | T | E | Mi |
|---|---|---|---|---|---|
| As-Spun | — | 0.58 | 2.8 | 1.1 | 331 |
| Heat Treated | 290° C. | 0.56 | 12.6 | 3.4 | 386 |
| (Best Value) |  |  | (14.0 | 3.7 | 380) |

I claim:

1. A copolyester consisting essentially of Units I, II and III, said units having the structural formulas:

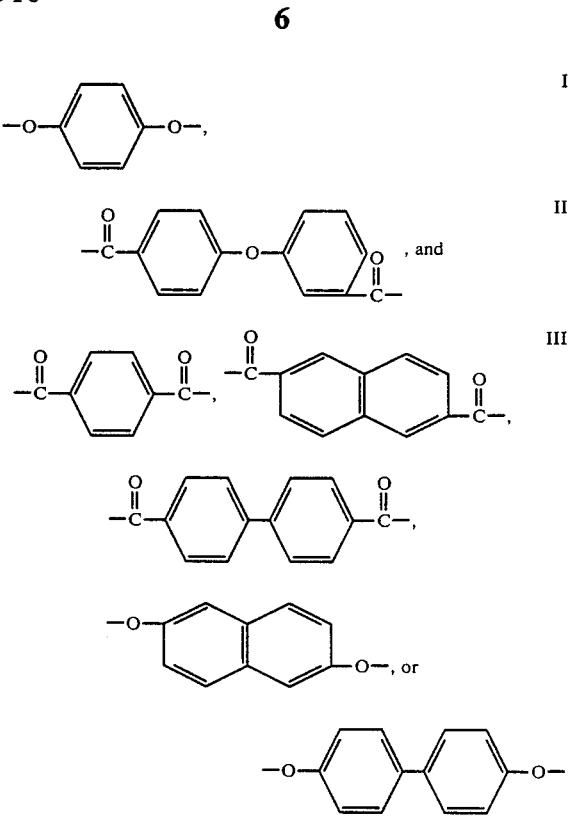

Where Units I and II are present in the amount of from about 30 to 50 mole % and Unit III is present in the amount of from 10 to 20 mole %.

2. A copolyester according to claim 1 wherein Unit III is

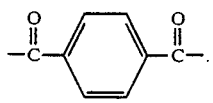

3. A copolyester according to claim 1 wherein Unit III is

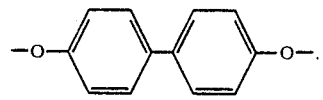

4. A fiber of the copolyester of claim 1.
5. A film of the copolyester of claim 1.
6. A molded or extruded article of the copolyester of claim 1.

* * * * *